US007079199B2

(12) United States Patent
Ko et al.

(10) Patent No.: US 7,079,199 B2
(45) Date of Patent: Jul. 18, 2006

(54) LIQUID CRYSTAL DISPLAY PANEL

(75) Inventors: Young Yik Ko, Kyoungki-do (KR); Sang Jin Park, Seoul (KR)

(73) Assignee: Boe Hydis Technology Co., Ltd., Kyoungki-do (KR)

( * ) Notice: Subject to any disclaimer, the term of this patent is extended or adjusted under 35 U.S.C. 154(b) by 0 days.

(21) Appl. No.: 10/862,839

(22) Filed: Jun. 7, 2004

(65) Prior Publication Data

US 2004/0218108 A1 Nov. 4, 2004

(30) Foreign Application Priority Data

Aug. 1, 2003 (KR) ..................... 10-2003-0053492

(51) Int. Cl.
*G02F 1/1333* (2006.01)

(52) U.S. Cl. ........................................ 349/40; 349/149

(58) Field of Classification Search .................. 349/40, 349/192, 149; 345/87; 257/59
See application file for complete search history.

(56) References Cited

U.S. PATENT DOCUMENTS 6,690,433 B1 * 2/2004 Yoo et al. ..................... 349/40
2003/0197814 A1 * 10/2003 Choi ........................... 349/40

* cited by examiner

*Primary Examiner*—Andrew Schechter
*Assistant Examiner*—David Chung
(74) *Attorney, Agent, or Firm*—Ladas & Parry LLP

(57) ABSTRACT

Disclosed is a liquid crystal display panel. The liquid crystal display panel includes an active region formed at an upper surface thereof with a plurality of gate lines and data lines aligned in cross to each other, in order to display image data applied to the data lines, a plurality of gate pads formed at a first outside of the active region and connected to each of the gate lines, a plurality of data pads formed at a second outside of the active region and connected to each of the data lines, and a pair of anti-electrostatic thin film transistors formed at each gate pad and each data pad, respectively, in order to carry out functions of inner and outer ESDs and to transfer static electricity generated from a corresponding pad to an adjacent pad. Due to the anti-electrostatic thin film transistors formed at each pad, an extra space for forming additional EDSs is not necessary, thereby minimizing a space occupied by the ESDs and maximizing a space section of the liquid crystal display panel.

4 Claims, 3 Drawing Sheets

D1 D2 D3 D4 • • •
A B C D
T1a T2a T3a T4a T1b T2b T3b T4b

LIQUID CRYSTAL DISPLAY PANEL

BACKGROUND OF THE INVENTION

1. Field of the Invention

The present invention relates to a liquid crystal display panel, and more particularly to a liquid crystal display panel, in which a size of an anti-ESD (electrostatic discharge) circuit capable of preventing an electrostatic discharge generated during a fabrication process of the liquid crystal display panel is minimized, thereby maximizing a space section of the liquid crystal display panel.

2. Description of the Prior Art

In general, a liquid crystal display panel is a flat type display device including two glass substrates and a liquid crystal layer filled between two glass substrates. A lower substrate of the liquid crystal display panel is formed on an upper surface thereof with gate lines and data lines, which are aligned in cross to each other in order to define pixel regions. Also, a pixel electrode and a thin film transistor, which are switched by a driving signal of the gate line in order to apply a signal of the data line to the pixel electrode, are aligned in each pixel region. In addition, a black matrix is aligned on an upper glass substrate of the liquid crystal display panel so as to prevent light from radiating into regions in which pixel electrodes are not formed. Also, a color filter layer is aligned in each of the pixel regions, and a common electrode is aligned at a front surface of the upper glass substrate.

Such liquid crystal display panels mainly include a liquid crystal panel used for displaying images, in which a plurality of gate lines and data lines are aligned in cross to each other and thin film transistors are aligned at cross points of the gate lines and data lines, and a gate drive IC and a source drive IC for applying driving voltage to the gate lines and the data lines of the liquid crystal panel, respectively.

Meanwhile, such a liquid crystal display panel generates an electrostatic discharge (ESD) when manufacturing processes, such as a deposition process, an etching process, and a cell fabricating process, are carried out. The electrostatic discharge may cause a breakage of devices and insulation layers, so articles are degraded and a yield rate of the articles is reduced.

For this reason, a production line is designed to include a conductive chuck and an anti-ESD cassette for preventing ESD. Also, pixels are designed such that the electrostatic discharge can be carried out without changing the properties of thin film transistor devices and wirings, if the panel is charged with static electricity.

For example, in order to prevent electrostatic discharge fault, a liquid crystal display panel typically employs a method for dispersing electric charges by connecting the all wirings to each other by means of resistance, thereby inducing a slow discharge of static electricity, as well as a method for performing the electrostatic discharge at a wiring formed at an outer portion of a scribe line. Herein, the former method is adapted mainly for TFT-LCDs, and the latter is adapted to a passive matrix liquid crystal display panel.

That is, a shorting bar or a shorting ring is formed on a substrate of the TFT-LCD, thereby preventing a fault of TFT-LCD caused by ESD.

FIG. 1 is a view showing a structure of a conventional liquid crystal display panel.

As shown in FIG. 1, the conventional liquid crystal display panel includes a gate ESD 1 and a data ESD 3, which are bound together by a shorting bar 5, for protecting a display panel from ESD. Generally, a common signal is applied to the shorting bar 5. Herein, the gate ESD 1 and the data ESD 3 are called "inner ESDs" being opposed in conception to outer ESDs, which will be described later.

A repair line 7 having a ⊏C-shape or a reverse ⊏C-shape is mounted at an outside of the shorting bar 5. Also, a plurality of gate pads 9 applying a driving signal to a gate line of the display panel and a plurality of data pads 11 applying the driving signal to a data line of the display panel are provided at an outside of a thin film transistor array substrate 100.

According to the above conventional liquid crystal display panel, static electricity, which is generated from an exterior of the liquid crystal display panel, is introduced into the shorting bar 5 through an outer gate ESD 13 and an outer data ESD 15 provided at an outside of the gate pads 9 and the data pads 11. Also, such static electricity introduced into the shorting bar 5 is distributed by the shorting bar 5, so that the static electricity spreads out over the whole area of the liquid crystal display panel.

Accordingly, a voltage difference between the outside and the inside of the liquid crystal display panel is minimized. In addition, even if an electrostatic discharge is suddenly generated, a fault caused by such an electrostatic discharge may be prevented. Also, the static electricity generated from the liquid crystal display panel while a fabrication process is being carried out can be discharged from the panel through an above-mentioned path, thereby minimizing the influence of the ESD.

However, such a conventional liquid crystal display panel has problems as follows.

Sizes of inner and outer ESDs formed in the liquid crystal display panel may occupy a space of few tens of micrometers to hundreds of micrometers. Herein, as the size of the liquid crystal display panel becomes reduced or enlarged, there is necessary to provide various patterns forming the liquid crystal display panel as well as the inner and outer ESDs. However, such sizes of the inner and outer ESDs may restrict the formation of various patterns, thereby resulting various faults in a liquid crystal display panel.

SUMMARY OF THE INVENTION

Accordingly, the present invention has been made to solve the above-mentioned problems occurring in the prior art, and an object of the present invention is to provide a liquid crystal display panel capable of forming a thin film transistor at upper and lower portions of each pad for preventing an electrostatic discharge, in such a manner that a space occupied by an ESD is minimized through removing an excess space for the ESD, thereby ensuring an extra space margin.

In order to accomplish this object, there is provided a liquid crystal display panel comprising: an active region formed at an upper surface thereof with a plurality of gate lines and data lines aligned in cross to each other, in order to display image data applied to the data lines; a plurality of gate pads formed at a first outside of the active region and connected to each of the gate lines; a plurality of data pads formed at a second outside of the active region and connected to each of the data lines; and a pair of anti-electrostatic thin film transistors formed at each gate pad and each data pad, respectively, in order to carry out functions of inner and outer ESDs and to transfer static electricity generated from a corresponding pad to an adjacent pad.

Herein, the anti-electrostatic thin film transistors formed at each pad are connected to thin film transistors, which are oppositely adjacent to the anti-electrostatic thin film transistors, so that static electricity is transferred to opposite pads according to a position of the anti-electrostatic thin film transistors.

BRIEF DESCRIPTION OF THE DRAWINGS

The above object, features and advantages of the present invention will be more apparent from the following detailed description taken in conjunction with the accompanying drawings, in which.

DETAILED DESCRIPTION OF THE PREFERRED EMBODIMENTS

Figure 1:
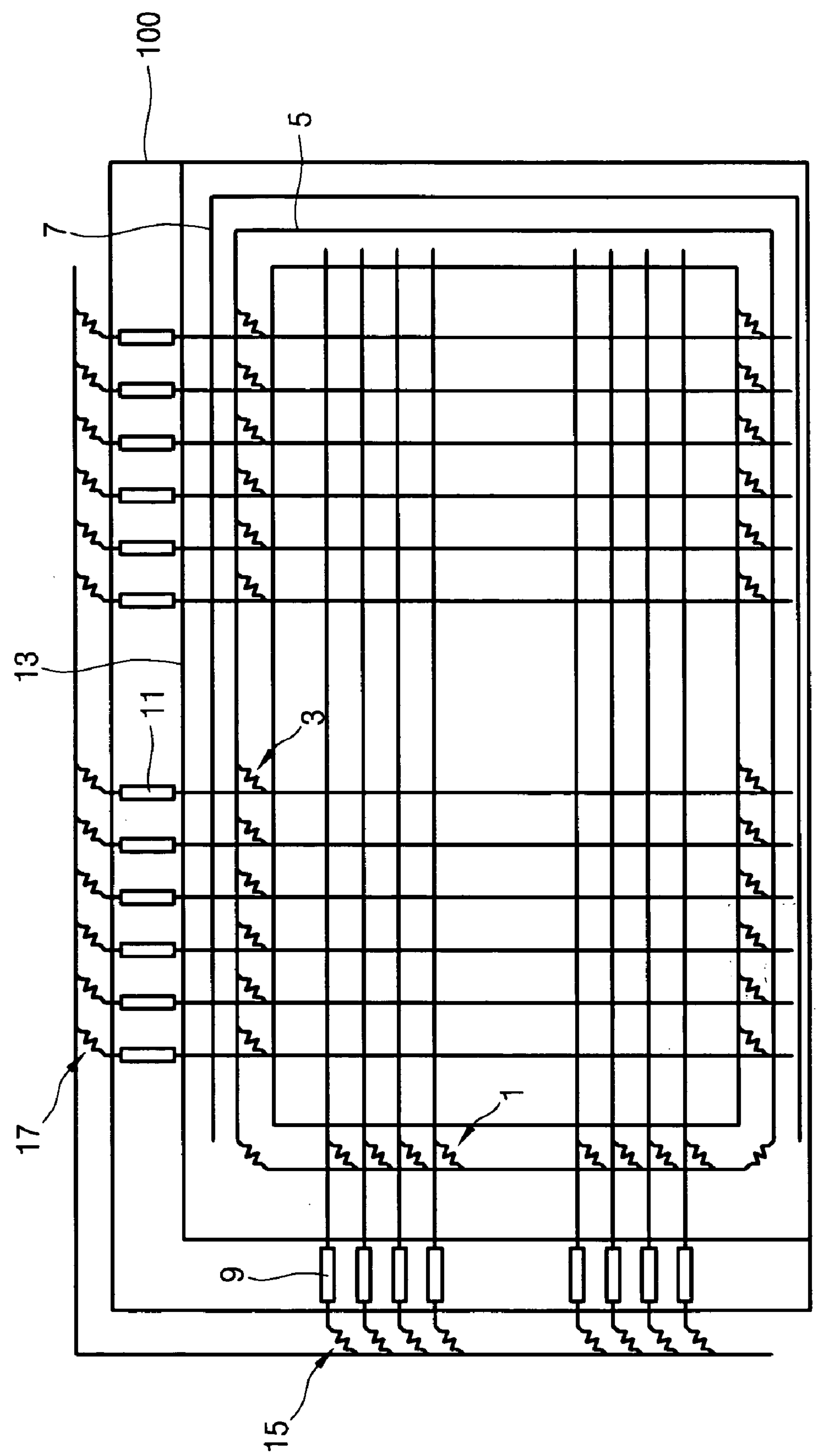
FIG. 1 is a view showing a structure of a conventional liquid crystal display panel.

Hereinafter, a preferred embodiment of the present invention will be described with reference to the accompanying drawings. In the following description and drawings, the same reference numerals are used to designate the same or similar components, and so repetition of the description on the same or similar components will be omitted.

Figure 2:
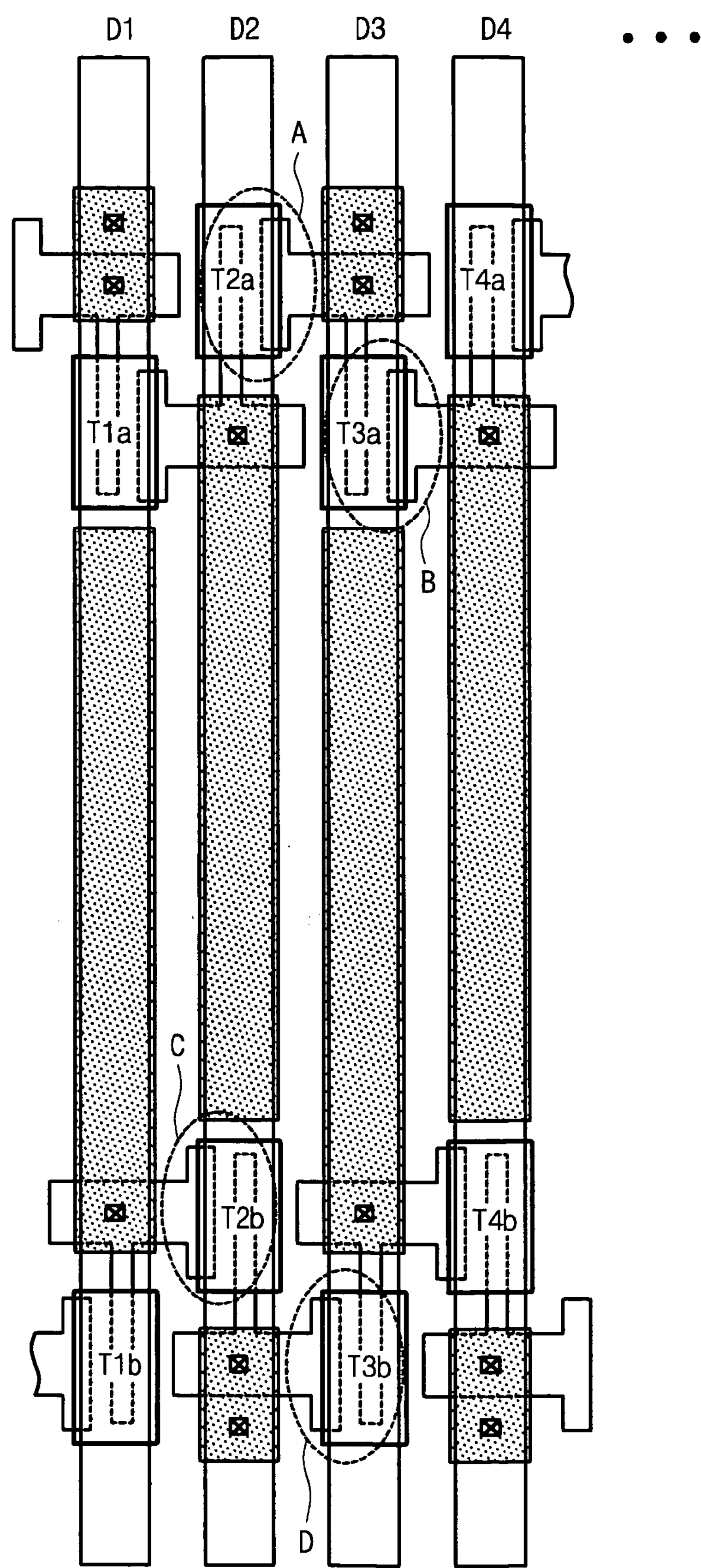
FIG. 2 is a view showing a structure of a data pad of a liquid crystal display panel according to the present invention.
Figure 3:
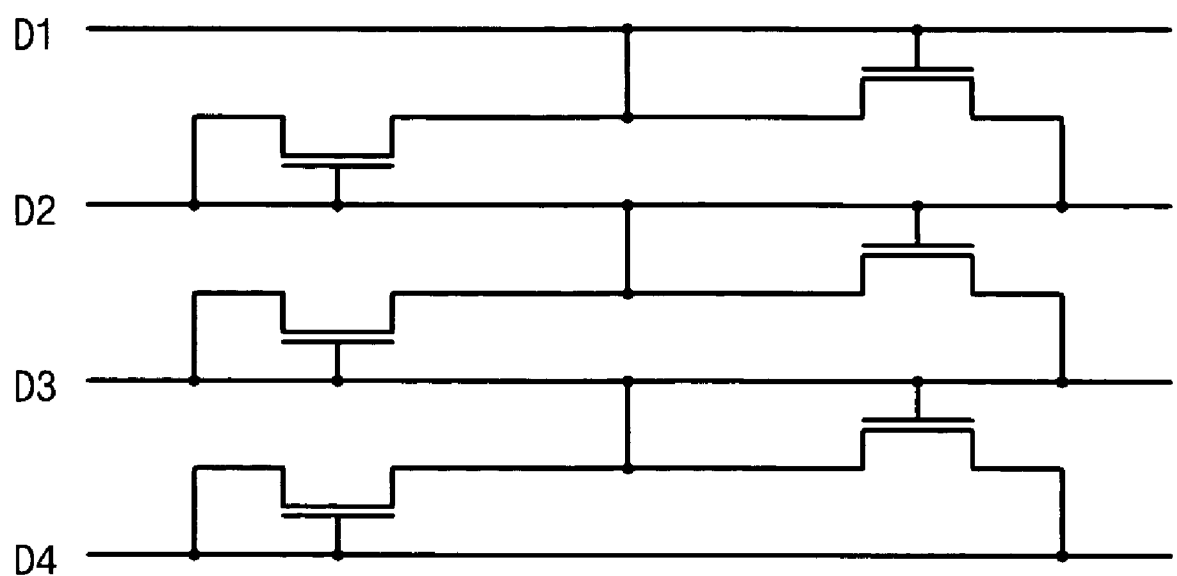
FIG. 3 is a view showing a circuit equivalent with that of FIG. 2.

FIG. 2 is a view showing a structure of a data pad of a liquid crystal display panel according to the present invention, and FIG. 3 is a view showing a circuit equivalent with that of FIG. 2.

Firstly, referring to FIG. 2, thin film transistors are formed at each of upper and lower portions of the data pad in order to prevent an electrostatic discharge. Such thin film transistors are identically adapted for a gate pad.

That is, according to the liquid crystal display panel of the present invention, a pair of thin film transistors are formed at each of the gate pad and the data pad so as to prevent the electrostatic discharge. Accordingly, static electricity is transferred to the all gate lines or the all data lines, causing the whole liquid crystal display panel to be charged with static electricity. At this time, the thin film transistors formed at each of the pads are classified into inner ESDs and outer ESDs according to an aligning position of the thin film transistors.

Hereinafter, a structure of the pad will be described in detail.

As shown in FIG. 2, a plurality of data pads D1, D2, D3, . . . , Dn are formed at an outside of a thin film transistor array substrate while forming an uniform interval therebetween, and thin film transistors T1*a*, T2*a*, T3*a*, Tna, which are electrically connected to adjacent data pads, are formed at upper and lower portions of each data pad.

For examples, a source terminal of a thin film transistor T1*a* formed at an upper portion of a first data pad D1 is connected to a drain terminal of a thin film transistor T2*a* formed at an upper portion of a second data pad D2 through a contact hole. Also, a source terminal of the thin film transistor T2*a* is connected to a drain terminal of a thin film transistor T3*a* formed at an upper portion of a third data pad D3 through the contact hole. In this way, thin film transistors T1*a*, T2*a*, T3*a*, . . . , Tna are formed at upper portions of all data pads in order to apply the static electricity to all data lines by connecting adjacent data pads to each other.

Also, in FIG. 2, a source terminal of a thin film transistor T4*b* formed at a lower portion of a fourth data pad D4 is connected to a drain terminal of a thin film transistor T3*b* formed at a lower portion of the third data pad D3 through the contact hole. Also, a source terminal of the thin film transistor T3*b* is connected to a drain terminal of a thin film transistor T2*b* formed at a lower portion of the second data pad D2 through the contact hole. In this way, thin film transistors T1*b*, T2*b*, T3*b*, . . . , Tnb are formed at lower portions of all data pads in order to apply the static electricity to all data lines by connecting to adjacent data pads to each other.

Hereinafter, an electrostatic discharge operation in the liquid crystal display panel of the present invention will be described.

As shown in FIG. 2, when the electrostatic discharge is generated in the second data pad D2, the thin film transistor T2*b* of a C region formed in a lower portion of the data pad D2 is turned ON, and thus, the static electricity is transferred to the first data pad D1 through the source terminal of the thin film transistor T2*b*.

In addition, the thin film transistor T1*a* of an A region formed in an upper portion of the second data pad D2 is turned ON, and thus, the static electricity is transferred to the third data pad D3 through the source terminal of the thin film transistor T2*a*.

In this manner, the static electricity generated from the second data pad D2 is transferred to an adjacent data pad through thin film transistors formed at upper and lower portions of each data pad, and thus, the static electricity is transferred to all data pads.

For example, the static electricity transferred to the third data pad D3 is transferred to the adjacent fourth data pad D4 through the source terminal of the thin film transistor T3*a* when the thin film transistor T3*a* of a B region formed in the upper portion of the third data pad D3 is turned ON.

Accordingly, when the electrostatic discharge is generated in a certain data pad from among data pads, the static electricity is transferred to an adjacent data pad through thin film transistors formed at the upper and lower portions of each data pad. As a result, the static electricity is transferred to all data pads, so a voltage difference between the outside and the inside of the liquid crystal display panel is minimized. Thus, the liquid crystal display panel can be prevented from being damaged by the electrostatic discharge.

Although the data pad is explained as an example in the present embodiment, thin film transistors transferring static electricity to an adjacent gate pad can be formed at upper and lower portions of a gate pad in the same manner as the data pad.

As described above, according to the present invention, the anti-electrostatic thin film transistors having a role of an inner ESD and an outer ESD are formed at upper and lower portions of data pads and gate pads in order to prevent the electrostatic discharge, so a space occupied by the inner and outer ESDs can be minimized, thereby preventing fault of articles derived from a lack of a space margin.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A liquid crystal display panel comprising:

an active region having an upper surface on which a plurality of parallel gate lines and a plurality of parallel data lines are formed, wherein the parallel gate lines are aligned to cross the parallel data lines;

a plurality of gate pads formed at a first area outside the active region and each gate pad being connected to each of the gate lines;

a plurality of data pads formed at a second area outside the active region and each data pad being, connected to each of the data lines; and a pair of anti-electrostatic thin film transistors (TFTs) formed at each gate pad and at each data pad, wherein a first terminal of one TFT is connected to the adjacent gate pad or data pad to transfer static electricity generated from the pad having the TFT to the adjacent pad, and wherein a first terminal of the other TFT is connected to the other adjacent gate pad or data pad to transfer static electricity generated from the pad having the other TFT to the other adjacent pad.

2. The liquid crystal display panel as claimed in claim 1, wherein the the first terminal of the TFT formed at each pad is connected to a second terminal of the TFT formed at the adjacent pad so that static electricity in one pad is transferred to a plurality of pads.

3. A liquid crystal display panel comprising:

an active region having an upper surface on which a plurality of parallel gate lines and a plurality of parallel data lines are formed, wherein the parallel gate lines are aligned to cross the parallel data lines;

a plurality of gate pads formed at a first area outside the active region and each gate pad being connected to each of the gate lines;

a plurality of data pads formed at a second area outside the active region and each data pad being connected to each of the data lines; and a pair of anti-electrostatic thin film transistors (TFTs) formed at both first and second ends of each gate pad and at both first and second ends of each data pad such that each gate and data pad serves as gate terminals of the pair of TFTs, wherein a first terminal of one TFT positioned at the first end of each pad is connected to the first end of the corresponding pad and to a second terminal of a TFT positioned at the first end of one adjacent pad, and wherein a first terminal of the other TFT positioned at the second end of each pad is connected to the second end of the corresponding pad and to a second terminal of another TFT positioned at the second end of the other adjacent pad, whereby static electricity generated from each pad can be transferred to the adjacent pads.

4. The liquid crystal display panel as claimed in claim 3, wherein the first terminal of one TFT positioned at the first end of each pad transfers static electricity in one direction, and the first terminal of the other TFT positioned at the second end of each pad transfers static electricity in the other direction which is opposite to the one direction.

* * * * *